United States Patent
Harima (10) Patent No.: US 7,188,267 B2
(45) Date of Patent: Mar. 6, 2007

(54) SEMICONDUCTOR DEVICE HAVING A FIRST CLOCK SIGNAL CONFIGURED TO OPERATE SYCHRONOUSLY WITH A SECOND CLOCK SIGNAL BY USE OF A MEASURING AND SETTING CIRCUIT

(75) Inventor: Takayuki Harima, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 433 days.

(21) Appl. No.: 10/370,404

(22) Filed: Feb. 19, 2003

(65) Prior Publication Data
US 2003/0159079 A1   Aug. 21, 2003

(30) Foreign Application Priority Data
Feb. 19, 2002   (JP) .............................. P2002-041815

(51) Int. Cl.
*G06F 1/12* (2006.01)
(52) U.S. Cl. .................. 713/400; 365/76; 365/233; 327/141
(58) Field of Classification Search ............ 713/400, 713/500, 326, 327, 348, 358, 368, 370, 375, 713/705, 709, 710, 712, 714; 365/76, 233; 327/141
See application file for complete search history.

(56) References Cited

U.S. PATENT DOCUMENTS

| | | | | |
|---|---|---|---|---|
| 6,061,294 A | * | 5/2000 | Koshikawa | 365/233 |
| 6,088,255 A | * | 7/2000 | Matsuzaki et al. | 365/76 |
| 6,108,793 A | * | 8/2000 | Fujii et al. | 713/400 |
| 6,201,423 B1 | * | 3/2001 | Taguchi et al. | 327/141 |
| 6,239,635 B1 | * | 5/2001 | Matsuzaki | 327/160 |
| 6,298,004 B1 | * | 10/2001 | Kawasaki et al. | 365/233 |
| 2001/0002799 A1 | * | 6/2001 | Saeki | 327/292 |
| 2001/0015666 A1 | * | 8/2001 | Noda et al. | 327/269 |

FOREIGN PATENT DOCUMENTS

| | | |
|---|---|---|
| JP | 01-219916 | 9/1989 |
| JP | 09-282889 | 10/1997 |
| JP | 2001-216047 | 8/2001 |
| JP | 2001-344972 | 12/2001 |

* cited by examiner

*Primary Examiner*—Chun Cao
*Assistant Examiner*—Sean Weinman
(74) *Attorney, Agent, or Firm*—Hogan & Hartson LLP (57) ABSTRACT

A first circuit is disposed on the semiconductor substrate, operates synchronously with a first clock signal, and outputs a first output signal delayed by a first delay time from the first clock signal. A first measuring circuit measures indirectly a first increase and a first decrease of the first delay time. A setting circuit operates synchronously with the first clock signal, outputs a second clock signal delayed from the first clock signal by a second delay time adding the first increase and subtracting the first decrease. A second circuit inputs the first output signal and operates synchronously with the second clock signal.

19 Claims, 12 Drawing Sheets

| COUNT | G11 (G21) (G31) | G12 (G22) (G32) | G13 (G23) (G33) | G14 (G24) (G34) | H100 (H200) (H300) | H101 (H201) (H301) | H102 (H202) (H302) | H103 (H203) (H303) | H104 (H204) (H304) | H105 (H205) (H305) | H106 (H206) (H306) | H107 (H207) (H307) | H108 (H208) (H308) | H109 (H209) (H309) | H110 (H210) (H310) | H111 (H211) (H311) |
|---|---|---|---|---|---|---|---|---|---|---|---|---|---|---|---|---|
| 0 | 0 | 0 | 0 | 0 | 1 | 1 | 1 | 1 | 1 | 1 | 1 | 1 | 1 | 1 | 1 | 1 |
| 1 | 1 | 0 | 0 | 0 | 1 | 1 | 1 | 1 | 1 | 1 | 1 | 1 | 1 | 1 | 1 | 0 |
| 2 | 0 | 1 | 0 | 0 | 1 | 1 | 1 | 1 | 1 | 1 | 1 | 1 | 1 | 1 | 0 | 0 |
| 3 | 1 | 0 | 1 | 0 | 1 | 1 | 1 | 1 | 1 | 1 | 1 | 1 | 1 | 0 | 0 | 0 |
| 4 | 0 | 1 | 1 | 0 | 1 | 1 | 1 | 1 | 1 | 1 | 1 | 1 | 0 | 0 | 0 | 0 |
| 5 | 1 | 0 | 1 | 0 | 1 | 1 | 1 | 1 | 1 | 1 | 1 | 0 | 0 | 0 | 0 | 0 |
| 6 | 0 | 1 | 0 | 0 | 1 | 1 | 1 | 1 | 1 | 1 | 0 | 0 | 0 | 0 | 0 | 0 |
| 7 | 1 | 1 | 0 | 0 | 1 | 1 | 1 | 1 | 1 | 0 | 0 | 0 | 0 | 0 | 0 | 0 |
| 8 | 0 | 0 | 0 | 1 | 1 | 1 | 1 | 1 | 0 | 0 | 0 | 0 | 0 | 0 | 0 | 0 |
| 9 | 1 | 0 | 0 | 1 | 1 | 1 | 1 | 0 | 0 | 0 | 0 | 0 | 0 | 0 | 0 | 0 |
| 10 | 0 | 1 | 0 | 1 | 1 | 1 | 0 | 0 | 0 | 0 | 0 | 0 | 0 | 0 | 0 | 0 |
| 11 | 1 | 0 | 1 | 1 | 1 | 0 | 0 | 0 | 0 | 0 | 0 | 0 | 0 | 0 | 0 | 0 |
| 12 | 0 | 0 | 1 | 1 | 0 | 0 | 0 | 0 | 0 | 0 | 0 | 0 | 0 | 0 | 0 | 0 |

FIG. 9

| COUNT | G11 (G21) (G31) | G12 (G22) (G32) | G13 (G23) (G33) | G14 (G24) (G34) | H100 (H200) (H300) | H101 (H201) (H301) | H102 (H202) (H302) | H103 (H203) (H303) | H104 (H204) (H304) | H105 (H205) (H305) | H106 (H206) (H306) | H107 (H207) (H307) | H108 (H208) (H308) | H109 (H209) (H309) | H110 (H210) (H310) | H111 (H211) (H311) |
|---|---|---|---|---|---|---|---|---|---|---|---|---|---|---|---|---|
| 0 | 0 | 0 | 0 | 0 | 1 | 1 | 1 | 1 | 1 | 1 | 1 | 1 | 1 | 1 | 1 | 1 |
| 1 | 1 | 0 | 0 | 0 | 1 | 1 | 1 | 1 | 1 | 1 | 1 | 1 | 1 | 1 | 1 | 0 |
| 2 | 0 | 1 | 0 | 0 | 1 | 1 | 1 | 1 | 1 | 1 | 1 | 1 | 1 | 1 | 0 | 0 |
| ③ | 1 | 1 | 0 | 0 | 1 | 1 | 1 | 1 | 1 | 1 | 1 | 1 | 1 | 0 | 0 | 0 |
| 4 | 0 | 0 | 1 | 0 | 1 | 1 | 1 | 1 | 1 | 1 | 1 | 1 | 0 | 0 | 0 | 0 |
| ⑤ | 1 | 0 | 1 | 0 | 1 | 1 | 1 | 1 | 1 | 1 | 1 | 0 | 0 | 0 | 0 | 0 |
| 6 | 0 | 1 | 1 | 0 | 1 | 1 | 1 | 1 | 1 | 1 | 0 | 0 | 0 | 0 | 0 | 0 |
| 7 | 1 | 1 | 1 | 0 | 1 | 1 | 1 | 1 | 1 | 0 | 0 | 0 | 0 | 0 | 0 | 0 |
| 8 | 0 | 0 | 0 | 1 | 1 | 1 | 1 | 1 | 0 | 0 | 0 | 0 | 0 | 0 | 0 | 0 |
| 9 | 1 | 0 | 0 | 1 | 1 | 1 | 1 | 0 | 0 | 0 | 0 | 0 | 0 | 0 | 0 | 0 |
| ⑩ | 0 | 1 | 0 | 1 | 1 | 1 | 0 | 0 | 0 | 0 | 0 | 0 | 0 | 0 | 0 | 0 |
| 11 | 1 | 1 | 0 | 1 | 1 | 0 | 0 | 0 | 0 | 0 | 0 | 0 | 0 | 0 | 0 | 0 |
| 12 | 0 | 0 | 1 | 1 | 0 | 0 | 0 | 0 | 0 | 0 | 0 | 0 | 0 | 0 | 0 | 0 |
| OUTPUT DESTINATION OF MEASURING CIRCUIT OF DELAY TIME T1 | | | | | $\overline{d1}$ | $\overline{c1}$ | $\overline{b1}$ | $\overline{a1}$ | | | | | | | | |
| OUTPUT DESTINATION OF MEASURING CIRCUIT OF DELAY TIME T2 | | | | | | | | | a2 | b2 | c2 | d2 | | | | |
| OUTPUT DESTINATION OF MEASURING CIRCUIT OF DELAY TIME T3 | | | | | | | | | | | a3 | b3 | c3 | d3 | | |

FIG.10

| COMPARISON BETWEEN COUNTED VALUES OF OSCILLATOR | COMPARISON BETWEEN OPERATION SPEEDS OF CIRCUIT TO BE MEASURED | COMPARISON BETWEEN DELAY TIMES T1, T2, AND T3 | INCREASE OR DECREASE OF DELAY TIME OF CKd TO CK0 |
|---|---|---|---|
| SMALL COUNTED VALUE OF F11 | SLOW (DELAY-TIME-SETTING CIRCUIT) | LONG T1 | DECREASE OF Td |
| LARGE COUNTED VALUE OF F11 | FAST (DELAY-TIME-SETTING CIRCUIT) | SHORT T1 | INCREASE OF Td |
| SMALL COUNTED VALUES OF F21 AND F31 | SLOW (DECODER) (CELL ARRAY) | LONG T2 AND T3 | INCREASE OF Td |
| LARGE COUNTED VALUES OF F21 AND F31 | FAST (DECODER) (CELL ARRAY) | SHORT T2 AND T3 | DECREASE OF Td |

SEMICONDUCTOR DEVICE HAVING A FIRST CLOCK SIGNAL CONFIGURED TO OPERATE SYCHRONOUSLY WITH A SECOND CLOCK SIGNAL BY USE OF A MEASURING AND SETTING CIRCUIT

CROSS REFERENCE TO RELATED APPLICATIONS

This application is based upon and claims the benefit of priority from prior Japanese Patent Applications No. P2002-41815, filed on Feb. 19, 2002; the entire contents of which are incorporated herein by reference.

BACKGROUND

The present invention relates to a synchronous semiconductor device. Moreover, the present invention relates to a timing control for receiving a clock signal for synchronization.

For a high speed operation of a synchronous semiconductor device, a fabrication process is decided as a target process based on a specification requested by a customer. Then, even if the target process fluctuates, operations are assured in the range of operational conditions for evaluating the specification. To assure the operations, operational timing between internal circuits of the semiconductor device is set. However, to assure the operation for process fluctuation, the above timing is set to the slowest timing which can be generated. Thereby, the high-speed operation which was originally designed for a semiconductor device may be sacrificed.

This is because the optimum operational timing between internal circuits which was originally designed by considering fluctuations in the fabrication conditions of the fabrication process of a semiconductor device is not an optimum timing for each semiconductor device.

SUMMARY OF THE INVENTION

A semiconductor device according to embodiments of the present invention includes a semiconductor substrate, a first circuit disposed on the semiconductor substrate, configured to operate synchronously with a first clock signal, and configured to output a first output signal delayed by a first delay time from the first clock signal, a first measuring circuit configured to measure indirectly a first increase and a first decrease of the first delay time, a setting circuit configured to operate synchronously with the first clock signal, configured to output a second clock signal delayed from the first clock signal by a second delay time adding the first increase and subtracting the first decrease, and a second circuit configured to input the first output signal and configured to operate synchronously with the second clock signal.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Semiconductor Device

Figure 1:
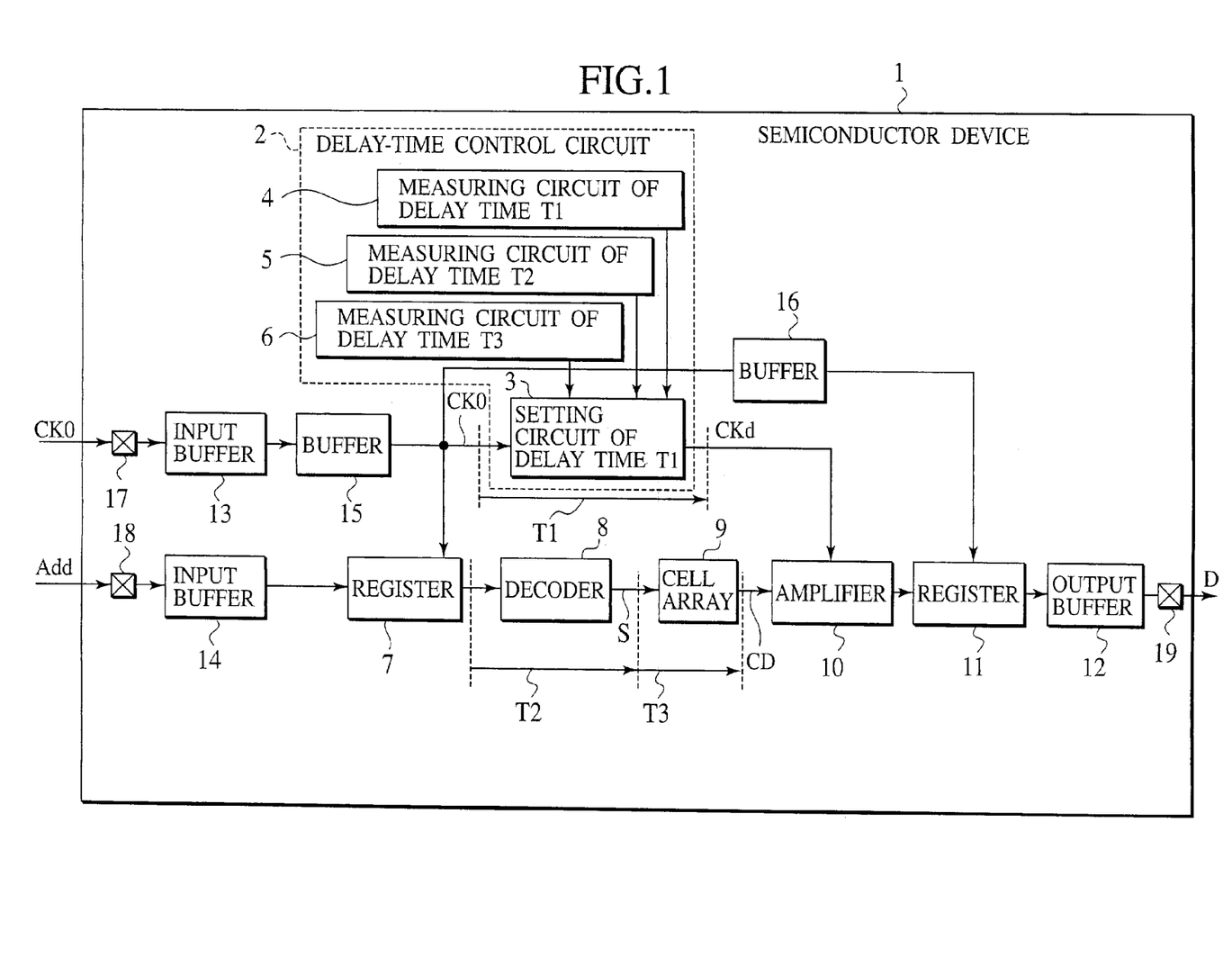
FIG. 1 is a block diagram of a semiconductor device of an embodiment.

As an example of a semiconductor device 1 of an embodiment of the present invention, a static random access memory (SRAM) shown in FIG. 1 is described below. However, as long as a synchronous memory is used, a nonvolatile memory such as a dynamic random access memory (DRAM) or flash memory can be applied to the semiconductor device 1. That is, any cell structure and mechanism of a memory can be applied to the semiconductor device 1. The case of reading a cell-data signal CD from a cell array 9 is described below. The semiconductor device 1 is formed on a semiconductor substrate.

An address signal Add is input to a pad 18 and also input to an input buffer 14. The address signal Add is input to a register circuit 7 from the input buffer 14.

A clock signal CK0 is input to a pad 17 and also input to an input buffer 13. The clock signal CK0 is input to the register circuit 7 from a buffer 15.

The register circuit 7 outputs the address signal Add to a decoder 8 synchronously with the clock signal CK0. The decoder 8 converts the received address signal Add into a cell selection signal S which can be processed by the cell array 9 and outputs the cell selection signal S to the cell array 9. For the decoder 8, the time required from inputting of the address signal Add up to outputting of the cell selection signal S is a decoder delay time T2.

The cell array 9 has a plurality of memory cells. In the cell array 9, a memory cell is selected according to the input cell selection signal S. The cell data signal CD of the selected memory cell is output to a sense amplifier 10. For the cell array 9, the time required from inputting of the cell selection signal S up to outputting of the cell data signal CD is assumed as a cell-data propagation time T3.

The clock signal CK0 is input to the delay-time control circuit 2. The delay-time control circuit 2 outputs a clock delay signal CKd delayed from the clock signal CK0 by a constant delay time to the sense amplifier 10 synchronously with the clock signal CK0. For the delay-time control circuit 2, the time required from inputting of the clock signal CK0 up to outputting of the clock delay signal CKd is assumed as an amplifier-activation control required time T1.

The delay-time control circuit 2 has a setting circuit 3 of the delay time T1, a measuring circuit 4 of the delay time T1, a measuring circuit 5 of the delay time T2, and a measuring circuit 6 of the delay time T3. The measuring circuit 4 of the delay time T1 directly or indirectly measures the amplifier-activation control required time T1. To indirectly measure the time T1, a dummy circuit is set in the semiconductor device 1, which functions so that the fluctuation of operation time due to the process fluctuation of the semiconductor device 1 is equal to that of the amplifier-activation control required time T1. The operation time of the dummy circuit is measured. In this case, the measuring circuit 4 of the delay time T1 is provided with the dummy circuit. Moreover, to measure the amplifier-activation control required time T1, the amplifier-activation control required time T1 is compared with a predetermined set value and a determination is made as to which is the longer time.

Moreover, the measuring circuit 5 of the delay time T2 directly or indirectly measures the decoder delay time T2. The measuring circuit 6 of the delay time T3 directly or indirectly measures the cell-data propagation time T3.

The setting circuit 3 of the delay time T1 outputs the clock delay signal CKd, delayed from the clock signal CK0 by the delay time increased or decreased according to the delay times T1 to T3 measured by the measuring circuits 4 to 6, to the sense amplifier 10 synchronously with the clock signal CK0.

The sense amplifier 10 detects and amplifies the cell data signal CD synchronously with the input clock delay signal CKd. By increasing or decreasing the delay time T1 by the setting circuit 3 of the delay time T1, it is possible to change the timing for detecting the cell data signal CD. The amplified cell data signal CD is output to a register circuit 11 as a data signal D.

The register circuit 11 outputs the data signal D to an output buffer 12 synchronously with a clock delay signal having a constant delay time, from the clock signal CK0 by a buffer 16. The output buffer 12 outputs the input data signal D to a pad 19.

Setting Circuit of Delay Time

Figure 2A:
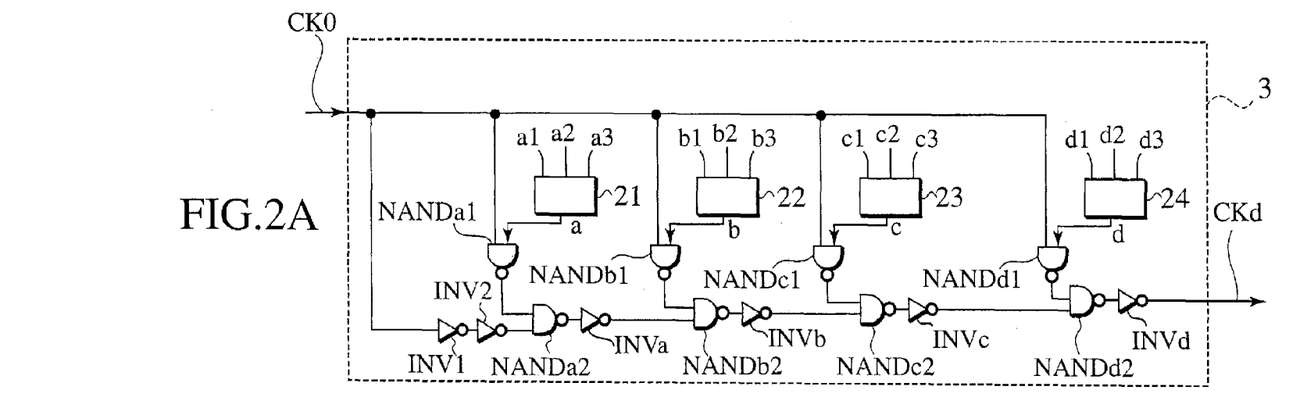
FIG. 2A is a block diagram of a delay-time-setting circuit of a delay-time-control circuit of an embodiment.

The setting circuit 3 of the delay time T1 of the semiconductor device 1 receives the clock signal CK0 and outputs the clock delay signal CKd synchronously with the clock signal CK0 as shown in FIG. 2A. The delay time of the clock delay signal CKd from the clock signal CK0 changes correspondingly to signals a1 to a3, b1 to b3, c1 to c3, or d1 to d3. A majority-decision circuit 21 decides output of a signal a according to the majority decision of signals a1 to a3. Moreover, majority-decision circuits 22 to 24 decide output of signals b to d according to the majority decision of the signals b1 to b3, c1 to c3, and d1 to d3. In FIG. 2A, the number of signals a to d is equal to 4. However, when it is necessary to increase or decrease the delay time T1 at a small time interval, the number of signals a to d is permitted to increase. When it is also necessary to set the delay time T1 over a wide range, the number of signals a to d is permitted to increase.

The clock signal CK0 is input to non-conjunctions NANDa1, NANDb1, NANDc1, and NANDd1 and the input terminal of an inverter INV1. The signal is input to the input terminal of the non-conjunction NANDa1. An output of the non-conjunction NANDa1 is input to the input terminal of the non-conjunction NANDa2. An output of the inverter INV1 is input to an inverter INV2. An output of the inverter INV2 is input to the input terminal of the non-conjunction NANDa2. An output of the non-conjunction NANDa2 is input to an inverter INVa. An output of the inverter INVa is input to the input terminal of the non-conjunction NANDb2.

The signal b is input to the input terminal of the non-conjunction NANDb1. An output of the non-conjunction NANDb1 is input to the input terminal of the non-conjunction NANDb2. An output of the non-conjunction NANDb2 is input to an inverter INVb. An output of the inverter INVb is input to the input terminal of the non-conjunction NANDc2. Signals c and d are also input to a logic circuit in the same manner as in the case of the signal b. Moreover, an output of an inverter INVd serves as the clock delay signal CKd.

Figure 2B:
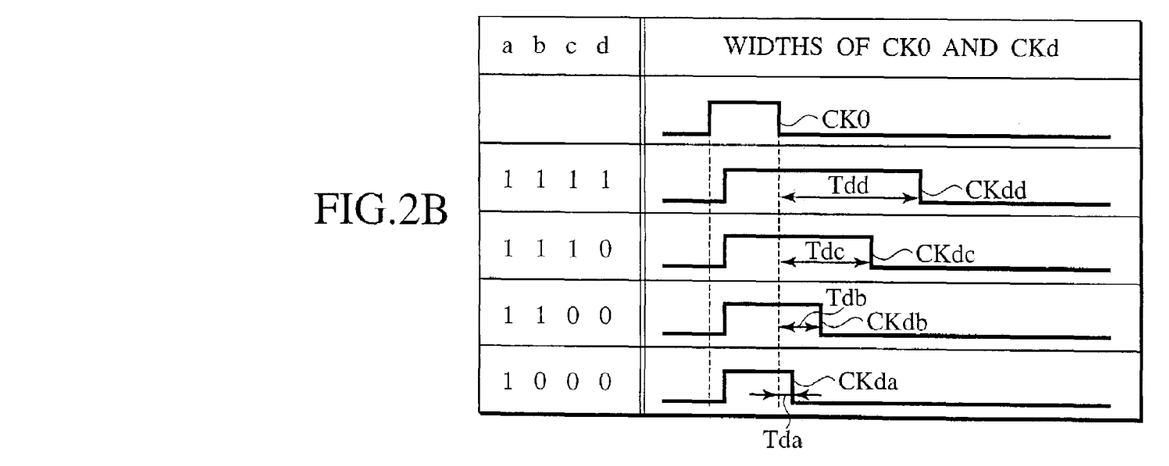
FIG. 2B is a table for showing a relation between an input signal and an output signal of a delay-time-setting circuit of a delay-time-control circuit of an embodiment.

FIG. 2B shows relations between the signals a to d on one hand and delay times Tda, Tdb, Tdc, and Tdd of the delay time T1 of the clock delay signal CKd from the clock signal CK0 on the other. For example, when the signals a to d are all equal to 1 and the clock signal CK0 is input to the setting circuit 3 of the delay time T1, the clock delay signal CKdd is output as the clock delay signal CKd. The delay time in the above case is equal to the delay time Tdd as shown in FIG. 2B.

When the signals a to c are equal to 1 and d is equal to 0, a clock delay signal CKdc whose delay time Tdc is shorter than the delay time Tdd is output. When the signals a and b are equal to 1 and the signals c and d are equal to 0, a clock delay signal CKdb whose delay time Tdb is shorter than the delay time Tdc is output. When the signal a is equal to 1 and the signals b to d are equal to 0, a clock delay signal CKda whose delay time Tda is shorter than the delay time Tdb is output. Thus, it is possible to increase or decrease a delay time according to the signals a to d.

Measuring Circuit of Delay Time

Figure 3A:
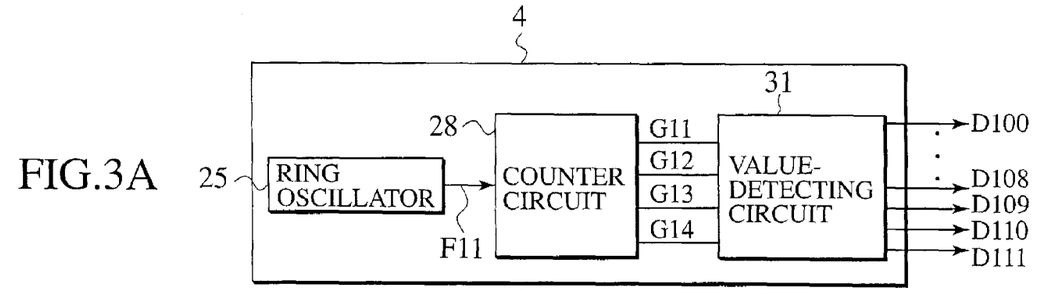
FIGS. 3A to 3C are block diagrams of measuring circuits for measuring delay times T1 to T3 of a delay-time-control circuit of an embodiment.

As shown in FIG. 3A, the measuring circuit 4 of the delay time T1 has a ring oscillator 25, counter circuit 28, and value-detecting circuit 31. The measuring circuit of the delay time T1 outputs signals D100 to D111.

The ring oscillator 25 is the so-called dummy circuit for indirectly measuring the amplifier-activation control required time T1. The fluctuation of the time required for a predetermined oscillation frequency of the ring oscillator 25 due to the fluctuations from fabrication conditions in the fabrication process of the semiconductor device 1 has a tendency to be the same as the fluctuation of the amplifier-activation control required time T1 due to the fluctuations of the fabrication process of the semiconductor device 1. By measuring the oscillation frequency of the ring oscillator 25 during a predetermined time, it is possible to estimate the fluctuation of the amplifier-activation control required time T1. For example, it is possible to estimate a decrease of the amplifier-activation control required time T1 according to increase of the oscillation frequency. The ring oscillator 25 outputs an oscillation signal F11 to the counter circuit 28.

The counter circuit 28 receives the oscillation signal F11, counts the oscillation frequency of the ring oscillator 25 during a predetermined time, and outputs signals G11 to G14 corresponding to the counted frequency.

The value-detecting circuit 31 receives the signals G11 to G14 to decide the oscillation frequency of the ring oscillator 25. The value-detecting circuit 31 outputs the signals D100 to D111 according to the decided frequency. Or, the value-detecting circuit 31 determines whether the oscillation frequency is larger than, equal to, or smaller than a predetermined value. The value-detecting circuit 31 outputs the signals D100 to D111 according to the determination result. Moreover, the value-detecting circuit 31 can be regarded as an encoder for converting the input signals G11 to G14 into the signal a1 and the like input to the setting circuit 3 of the delay time T1 and encoding the signals G11 to G14.

Figure 3B:
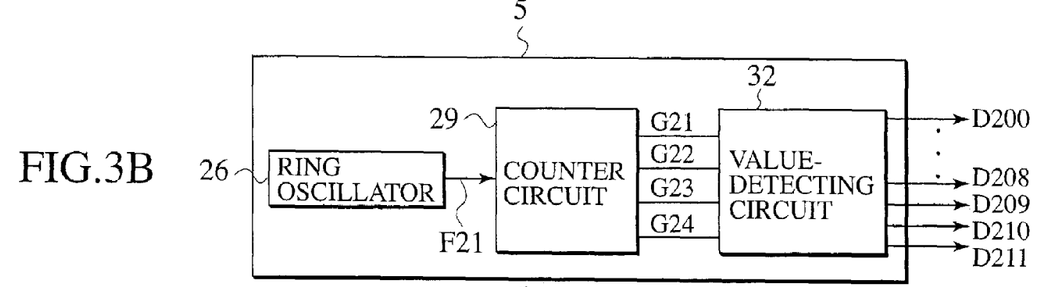
Figure 3C:
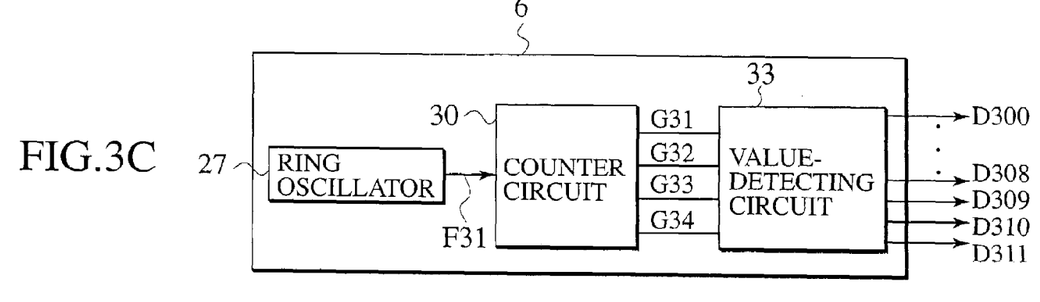

As shown in FIG. 3B, the measuring circuit 5 of the delay time T2 has the same structure as the measuring circuit 4 of the delay time T1 in FIG. 3A. As shown in FIG. 3C, the measuring circuit 6 of the delay time T3 has the same structure as the measuring circuit 4 of the delay time T1 in FIG. 3A.

Ring Oscillators

Figure 4A:
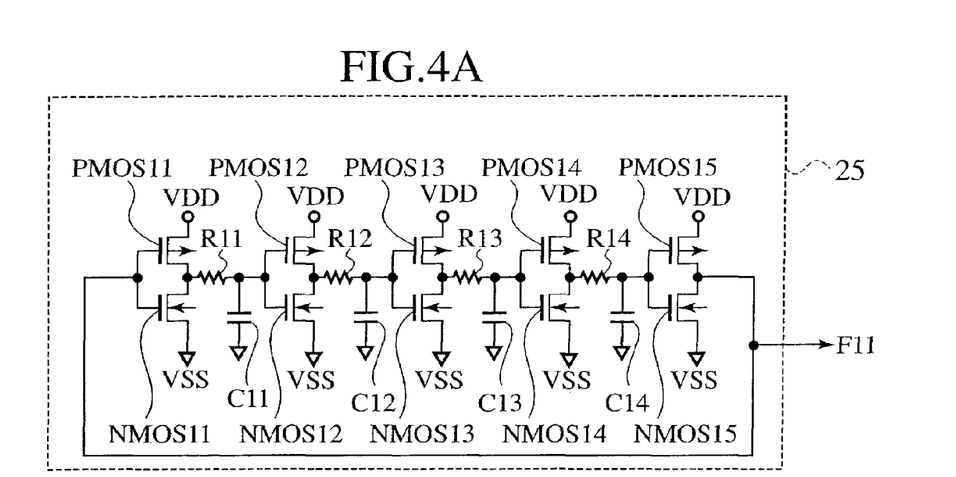
FIGS. 4A to 4C are schematic block diagrams of ring oscillators of a delay-time-measuring circuit of a delay-time-control circuit of an embodiment.

As shown in FIG. 4A, the ring oscillator serving as an oscillator outputs the oscillation signal F11. The oscillation signal F11 is input to gate electrodes of a p-type MOS transistor pMOS 11 and an n-type MOS transistor nMOS 11. The pMOS 11 and nMOS 11 constitute an inverter. The drain electrode of the pMOS 11 is electrically connected to a power supply potential VDD. The source electrode-of the pMOS 11 is electrically connected to the drain electrode of the nMOS11 and one end of a resistance R11. The source electrode of the nMOS 11 is electrically connected to the power source potential VSS of the ground potential. The other end of the resistance R11 is electrically connected to one end of a capacitor C11 and gate electrodes of a pMOS 12 and an nMOS 12. The other end of the capacitor C11 is electrically connected to the power source potential VSS. It is not necessary that the resistance R11 is a resistance based on a resistive element. It is permitted for the resistance R11 to be a distributed resistance created by wiring or the like or a contact resistance created by the structure of the semiconductor device 1. Moreover, it is not necessary that the capacitor C11 is a capacitor based on a capacitive element. It is permitted for the capacitor C11 to be an inter-wiring capacitance created by wiring, the capacitance of a gate electrode created by structures of the pMOS 12 and nMOS 12, or the capacitance between semiconductor substrates.

Moreover, these resistances and capacitances are set so that they are equal to the resistance and capacitance of the setting circuit 3 of the delay time T1 in FIG. 1. Specifically, sizes and structures of transistors pMOS and nMOS are made equal to each other by the setting circuit 3 of the delay time T1 and the ring oscillator 25. Wiring lengths and wiring intervals are equal in the wiring of the setting circuit 3 of the delay time T1 and the ring oscillator 25. The ring oscillator 25 is constituted by a MOS transistor in which gate (Gate) lengths, gate insulating film thicknesses (Tox), and threshold voltages used for the critical path of the setting circuit 3 are properly arranged and wiring in which FanOuts and parasitic CRs for connecting inverters to each other are properly arranged. The ring oscillator 25 is constituted by inverters of odd stages. By constituting the ring oscillator 25 as described above, it is possible to obtain an operational tendency which is the same as the operational tendency of the increase or decrease of the delay time T1 which can be obtained from the oscillation signal F11 of the ring oscillator 25 when fluctuations of the fabrication process of the semiconductor device 1 occurs. Structures of the pMOS 12 to pMOS 15 are permitted to be the same as the structure of the pMOS 11. Structures of the nMOS 12 to nMOS 15 are permitted to be the same as the structure of the nMOS 11. Also, resistance values of the resistances R12 to R14 are permitted to be the same as the resistance value of the resistance R11. Capacitances of the capacitors C12 to C14 are permitted to be the same as the resistance value of the capacitor C11.

Figure 4B:
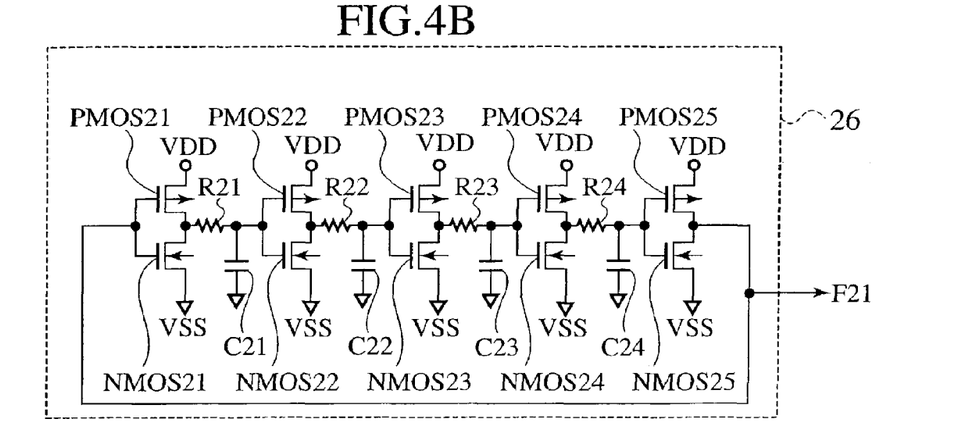
Figure 4C:
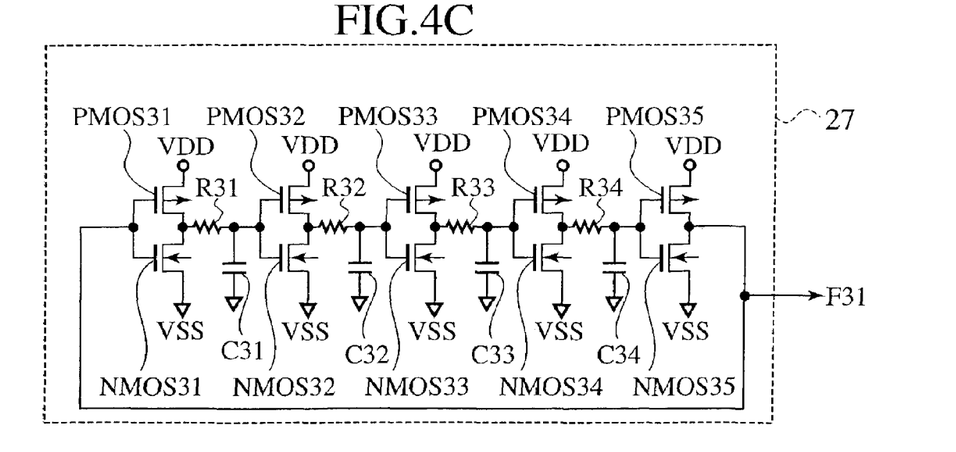

As shown in FIG. 4B, a ring oscillator 26 has the same structure as the ring oscillator 25 in FIG. 4A. However, the ring oscillator 26 has a structure that is also different from the ring oscillator 25 so that the decoder delay time T2 can be measured. The difference which cannot be shown, is in the sizes and structures of the transistors pMOS 21 to pMOS 25 and nMOS 21 to nMOS 25, which are different from sizes and structures of the pMOS 11 and nMOS 11. In the case of wiring, the wiring length and wiring interval of the ring oscillator 26 may be different from that of the ring oscillators 25. Thereby, values of the resistances R21 to R25 peculiar to the ring oscillator 26 and capacitances of the capacitors C21 to C25 peculiar to the ring oscillator 26 are set. As shown in FIG. 4C, a ring oscillator 27 has the same structure as the ring oscillator 25 in FIG. 4A. However, the ring oscillator 27 has a structure that is different from the ring oscillator 25 or 26 with the difference again being in the sizes and structures of the n-type and p-type transistors and associated wiring so that the cell-data propagation time T3 can be measured.

Counter Circuits

Figure 5:
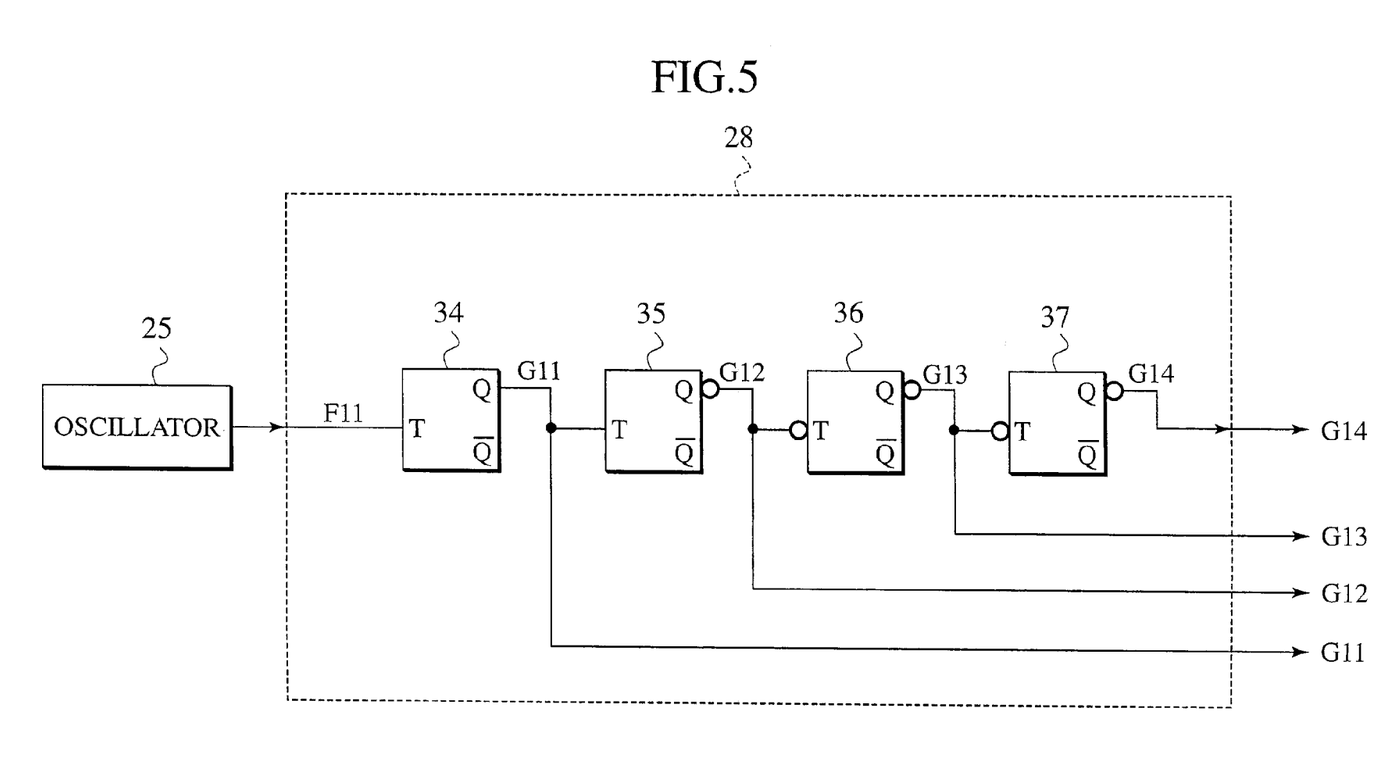
FIG. 5 is a block diagram of a counter circuit of a delay-time-measuring circuit of a delay-time-control circuit of an embodiment.

As shown in FIG. 5, the counter circuit 28 receives the oscillation signal F11 and outputs the signals G11 to G14. The oscillation signal F11 is input to the input terminal T of a toggle flip flop 34. The signal G11 is output from the output terminal Q of the toggle flip-flop 34 and input to the input terminal T of a toggle flip-flop 35. The inverted signal G12 of a signal output from the output terminal Q of the toggle flip-flop 35 is output and the inverted signal of the inverted signal G12 is input to the input terminal T of a toggle flip-flop 36. The inverted signal G13 of a signal output from the output terminal Q of the toggle flip-flop 36 is output and the inverted signal of the inverted signal 13 is input to the input terminal T of a toggle flip-flop 37. The inverted signal G14 of a signal output from the output terminal Q of the toggle flip-flop 37 is output. The counter circuit 29 in FIG. 3B and the counter circuit 30 in FIG. 3C have the same structure as the counter circuit 28 in FIG. 3A and FIG. 5.

Value Detecting Circuits

Figure 6:
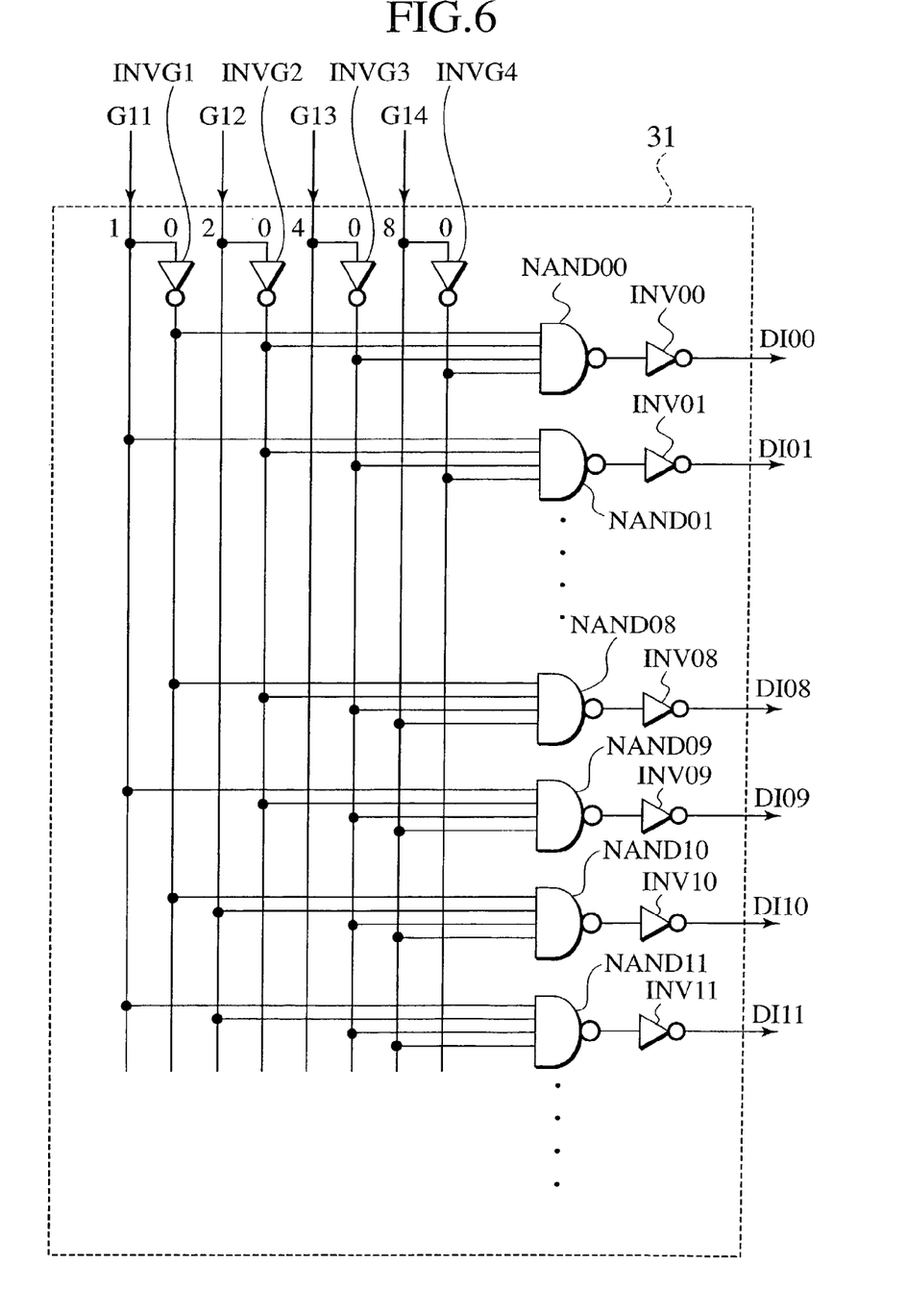
FIG. 6 is a block diagram of a part of a value-detecting circuit of a delay-time-measuring circuit of a delay-time-control circuit of an embodiment.

As shown in FIG. 6, the value detecting circuit 31 receives the signals G11 to G14 and outputs the signals D100 to D111. The signal G11 is input to the input terminal of an inverter INVG1. The signal G12 is input to the input terminal of an inverter INVTG2. The signal G13 is input to the input terminal of an inverter INVG3. The signal G14 is input to the input terminal of an inverter INVG4.

Negative signals of the signals G11 to G14 are input to a non-conjunction NAND00. An output of the non-conjunction NAND00 is input to an inverter INV00 and an output of the inverter INV00 becomes the signal D100.

The signal G11 and negative signals of the signals G12 to G14 are input to a non-conjunction NAND01. An output of the non-conjunction NAND01 is input to an inverter INV01 and the output of the inverter INV01 becomes the signal D101.

The signal G14 and negative signals of the signals G11 to G13 are input to a non-conjunction NAND08. An output of the non-conjunction NAND08 is input to an inverter INV08 and the output of the inverter INV08 becomes the signal D108. Subsequently and similarly, in the case of a signal D109, the signals G11 and G14 and negative signals of the signals G12 and G13 are input to a non-conjunction NAND09. An output of the non-conjunction NAND09 is input to an inverter INV09 and the output of the inverter INV09 becomes the signal D109. In the case of a signal D110, the signals G12 and G14 and negative signals of the signals G11 and G13 are input to a non-conjunction NAND10. An output of the non-conjunction NAND10 is input to an inverter INV10 and the output of the inverter INV10 becomes the signal D110. In the case of a signal D111, the signals G11, G12, and G14 and the negative signal of the signal G13 are input to a non-conjunction NAND11. An output of the non-conjunction NAND11 is input to an inverter INV11 and the output of the inverter INV11 becomes the signal D111.

Figure 7:
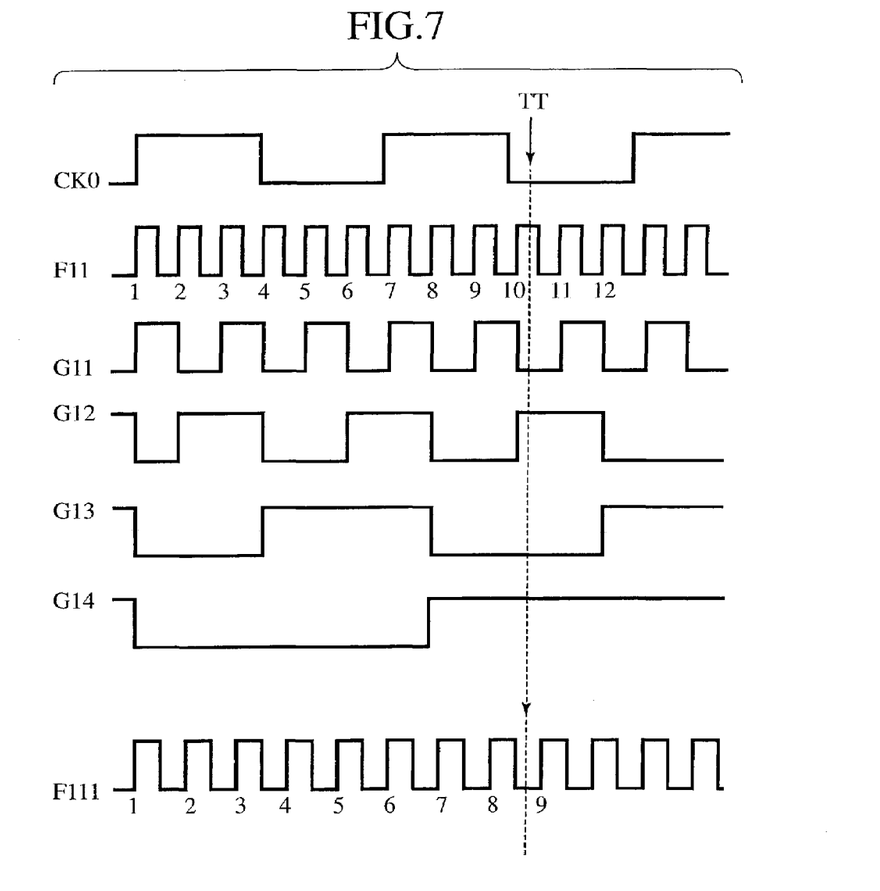
FIG. 7 is a timing chart showing a relation between an input signal and an output signal of a delay-time-measuring circuit of a delay-time-control circuit of an embodiment.

Operations of Delay-Time Control Circuit (a) When one Delay Time Measuring Circuits 1 to 4 is Used:

Operations of the delay-time control circuit 2 are described below. Operations of the measuring circuit 4 of the delay time T1 and the setting circuit 3 of the delay time T1 which have basic configurations are described below. First, as shown in FIG. 7, counting by the counter circuit 28 is started according to the clock signal CK0. A predetermined time TT from the start of the counting is set according to the clock signal CK0. The oscillation frequency of generated oscillation signals F11 is counted during the period from the start-up to the time TT.

The ring oscillator 25 oscillates at a constant frequency and outputs the oscillation signal F11 having the constant frequency. Because the frequency depends on fluctuations occurring because of the fabrication process of the semiconductor device 1, the frequency has a value peculiar to each semiconductor device 1. The number of stages of an inverter are determined so that the size of the measuring circuit 4 of the delay time T1 decreases as do the sizes of the counter circuit 28 and value-detecting circuit 31 according to a critical path for influencing the delay time T1 of the setting circuit 3 of the delay time T1.

Thus, it is possible to count the oscillation frequency of the oscillation signal F11 during the determined constant time TT. It is possible to detect the number of vibrations counted by the counter circuit 28 by the value-detecting circuit 31. Moreover, the value-detecting circuit 31 optimizes the delay time T1 and the generation timing of the clock delay signal CKd by adjusting the number of delay stages of the setting circuit 3 of the delay time T1 shown in FIGS. 2A and 2B.

For example, as shown in FIG. 7, when the semiconductor device 1 is fabricated in the target fabrication process, the oscillation signal F11 is oscillated ten times during the period (e.g. 10 ns) from start up to the time TT. When the signal F11 is oscillated ten times, the counter circuit 28 outputs 0 as the signal G11, 1 as the signal G12, 0 as the signal G13, and 1 as the signal G14 at the time TT. The value-detecting circuit 31 outputs 1 from only the signal D110 according to outputs of the signals G11 to G14. The value-detecting circuit 31 detects that the signal D110 is set to 1 at the time TT. The oscillation signal F11 is oscillated ten times according to the above detection and the value-detecting circuit 31 can determine that the delay time T1 is optimized.

When the gate length of the transistor MOS 11 or the like of the ring oscillator 25 is increased due to the fluctuations from the fabrication process of the semiconductor device 1, the oscillation signal F111 is oscillated eight times during the period from start up to the time TT. The value-detecting circuit 31 outputs 1 according to only the signal D108. The value-detecting circuit 31 detects that the signal D108 is set to 1 at the time TT. The oscillation signal F111 is oscillated eight times according to the detected value 1 and the value-detecting circuit 31 can determine that a delay corresponding to two times of oscillation also occurs in the setting circuit 3 of the delay time T1. Therefore, the value-detecting circuit 31 and the setting circuit 3 of the delay time T1 reduce the number of delay stages of the setting circuit 3 of the delay time T1 according to FIG. 2B. According to the reduction of the number of delay stages, the delay time T1 can be optimized for each and every semiconductor device 1.

Actually, internal components of the semiconductor device 1 of the sense amplifier 10 or the like are controlled according to relative relations between several signals CKd and CD. Therefore, the ring oscillators 26 and 27 are provided for the decoder 8 and cell array 9 which are circuits whose delay times easily fluctuate due to the fabrication process fluctuations in circuits of the semiconductor device 1. By setting a delay time according to the relative relation of the increase or decrease of the number of counters of the ring oscillators 25 to 27, it is possible to accurately optimize the delay time T1. It is possible to set an optimum timing for inputting a clock signal to an internal circuit for synchronization.

The semiconductor device 1 can be also considered as having the following configuration. The semiconductor device 1 has the ring oscillator 27 serving as an oscillation circuit for time-oscillating the constant time TT. The counter circuit 30 counts the oscillation frequency of the constant time TT of the oscillation circuit 27. The setting circuit 3 of the delay time T1 outputs the clock delay signal CKd delayed by the delay time T1, as increased or decreased according to the oscillation frequency from the clock signal CK0 synchronously with the clock signal CK0. The cell array 9 operates synchronously with the clock signal CK0 and outputs the output signal CD. The sense amplifier 10 operates according to the output signal CD synchronously with the clock delay signal CKd.

Figure 8:
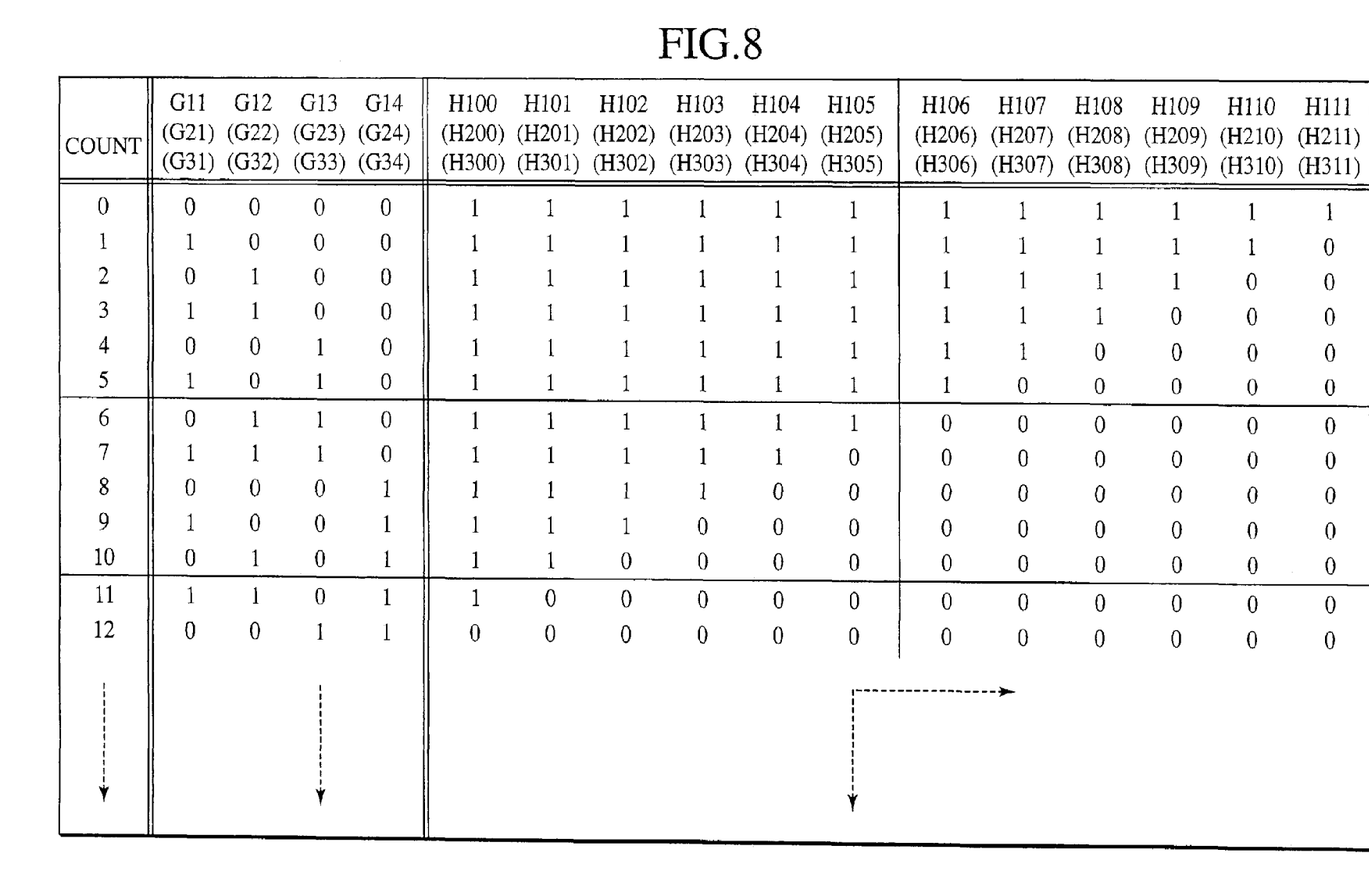
FIG. 8 is a truth table of a value-detecting circuit of a delay-time-measuring circuit of a delay-time-control circuit of an embodiment.

(b) When Two or More Delay-time-measuring Circuits 4 to 6 are Used:

A method is described below which reduces the number of delay stages of the setting circuit 3 of the delay time T1 by the value detecting circuits 31 to 33 according to FIG. 2B. First, each of the value detecting circuits 31 to 33 newly outputs signals H100 to H111, H200 to H211, and H300 to H311. The value detecting circuits 31 to 33 output the signals H100 to H111, H200 to H211, and H300 to H311 to the input signals G11 to G14 according to the relation of the truth table shown in FIG. 8.

Figure 9:
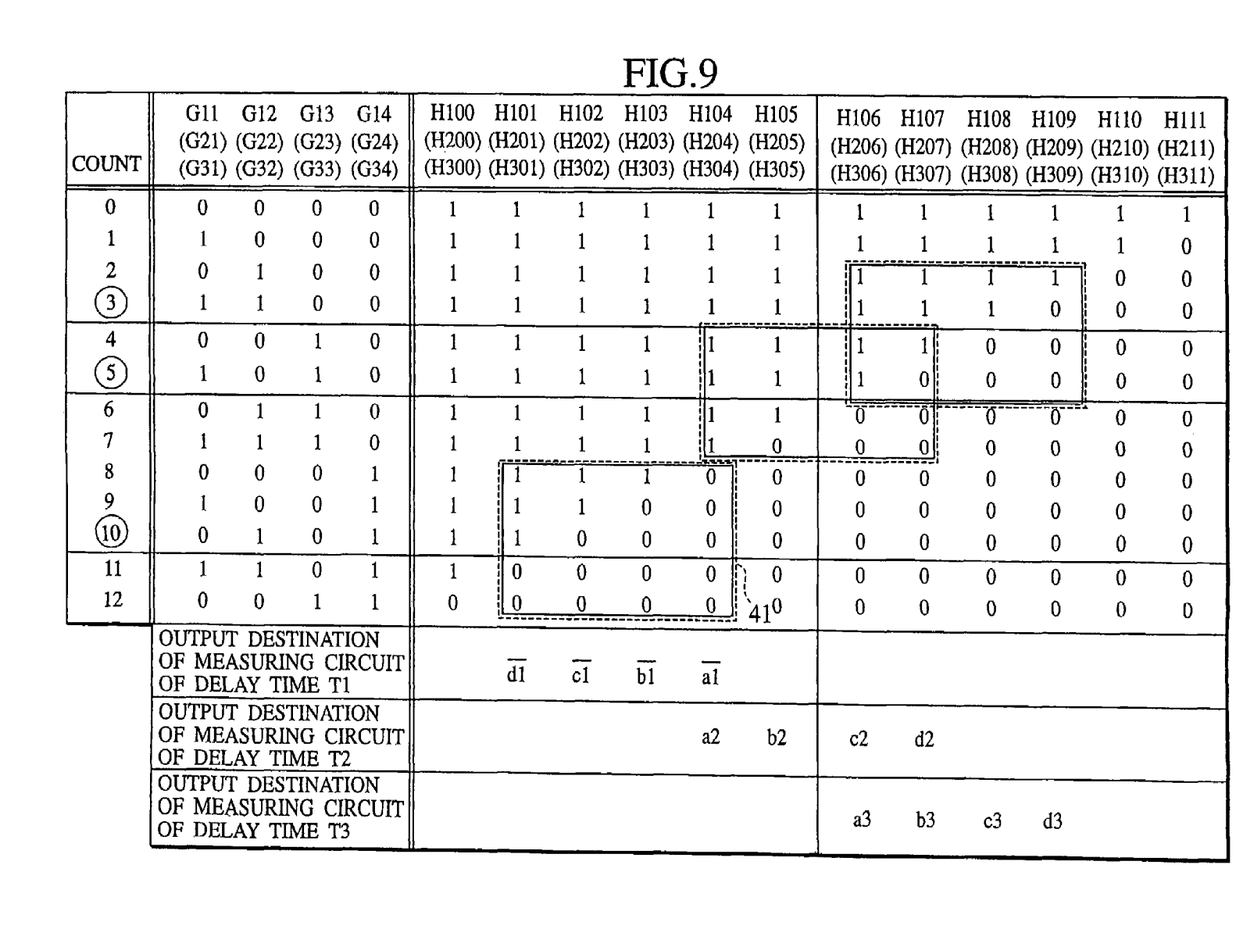
FIG. 9 is a table showing an input/output relation of input and output signals of a delay-time-measuring circuit of a delay-time-control circuit of an embodiment.

Then, the signals H100 to H111 output from the value detecting circuit 31 are output to the setting circuit 3 of the delay time T1. As shown in FIG. 9, the negative of the signal H101 is output as a signal d1 in FIG. 2A. The negative of the signal H102 is output as a signal c1. The negative of the signal H103 is output as a signal b1. The negative of the signal H104 is output as a signal a1. Thereby, the value-detecting circuit 31 can control delay times Tda to Tdd shown in FIG. 2B when the counted value of the counter circuit 28 ranges between 8 and 11. For example, it is assumed that the counted value for ten count times is equal to the counted value when the semiconductor device 1 is fabricated in the target process. In this case, the delay time T1 can be the delay time Tdc. When the semiconductor device 1 is not fabricated in the target process but the counted value is equal to 8, the delay time T1 can be the delay time Tda shorter than the delay time Tdc. According to the above processing, it is possible to set the optimum delay time T1 of each semiconductor device. According to the description of the above processing, it is possible to consider that a window 41 for influencing the control range of a delay time is set in the above processing. Once the window 41 is set, it is not necessary to incorporate the unnecessary signal H100 or the like into the semiconductor device 1.

Moreover, the signals H200 to H211 output from the value detecting circuit 32 are output to the setting circuit 3 of the delay time T1. The signal H204 is output as a signal a2. The signal H205 is output as a signal b2. The signal H206 is output as a signal c2. The signal H207 is output as a signal d2. Thereby, the value-detecting circuit 32 can control the delay times Tda to Tdd when the counted value of the counter circuit 29 ranges between 4 and 7.

The signals H300 to H311 output from the value detecting circuit 323 are output to the setting circuit 3 of the delay time T1. The signal H306 is output as a signal a3. The signal H307 is output as a signal b3. The signal H308 is output as a signal c3. The signal H309 is output as a signal d3. Thereby, the value detecting circuit 33 can control the delay times Tda to Tdd when the counted value of the counter circuit 30 ranges between 2 and 5.

Signals a1 to a3, b1 to b3, c1 to c3, and d1 to d3 are input to the majority decision circuits 21 to 24. Therefore, when all the value detecting circuits 31 to 33 output signals a1 to a3, b1 to b3, c1 to c3, and d1 to d3 which can be set to the delay time Tda, a delay time is set to Td. When signals a1 to a3, b1 to b3, c1 to c3, and d1 to d3 which can be set to delay times Tda to Tdd different in the value detecting circuits 31 to 33 are output, it is possible to set a delay time which is not the maximum or minimum value of the different delay times.

Figure 10:
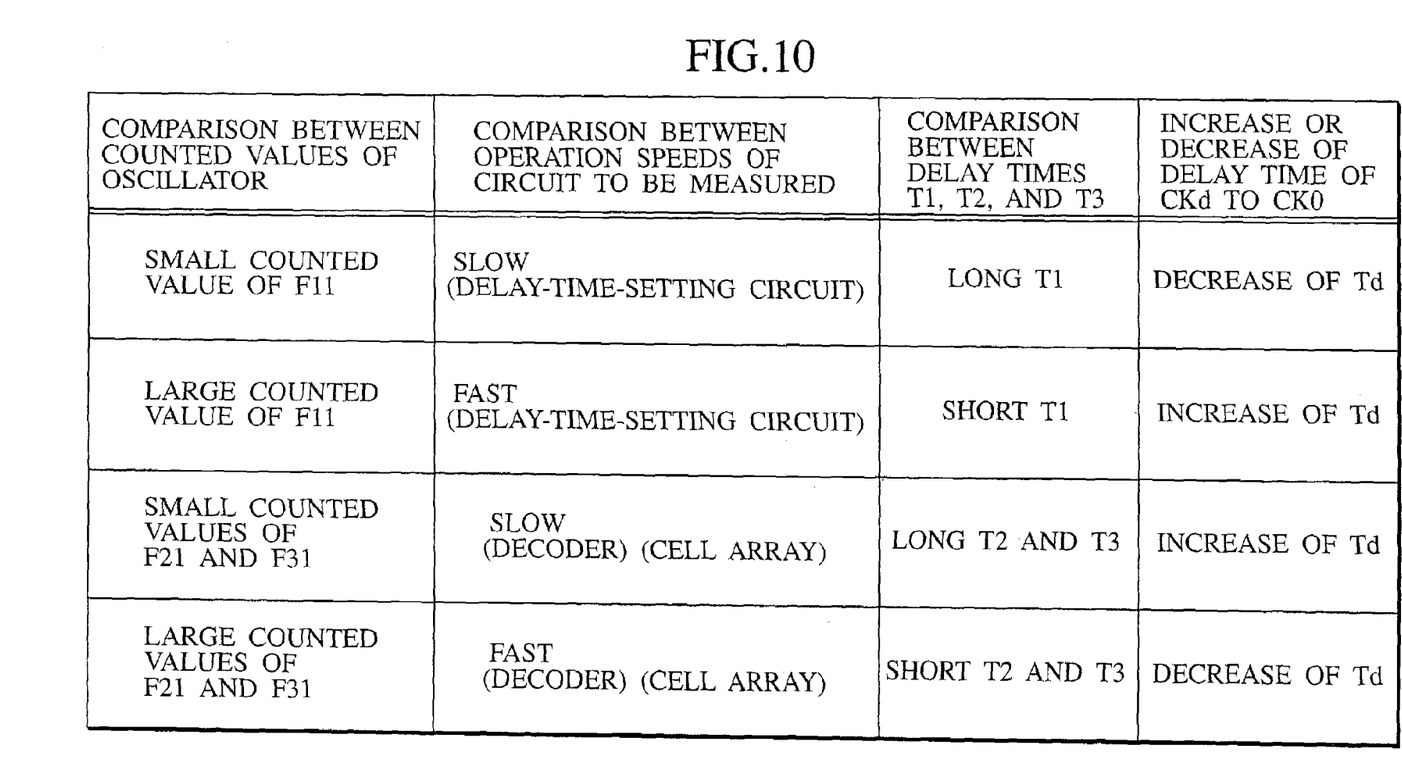
FIG. 10 is a table for explaining operations of a semiconductor device of an embodiment.
Figure 11:
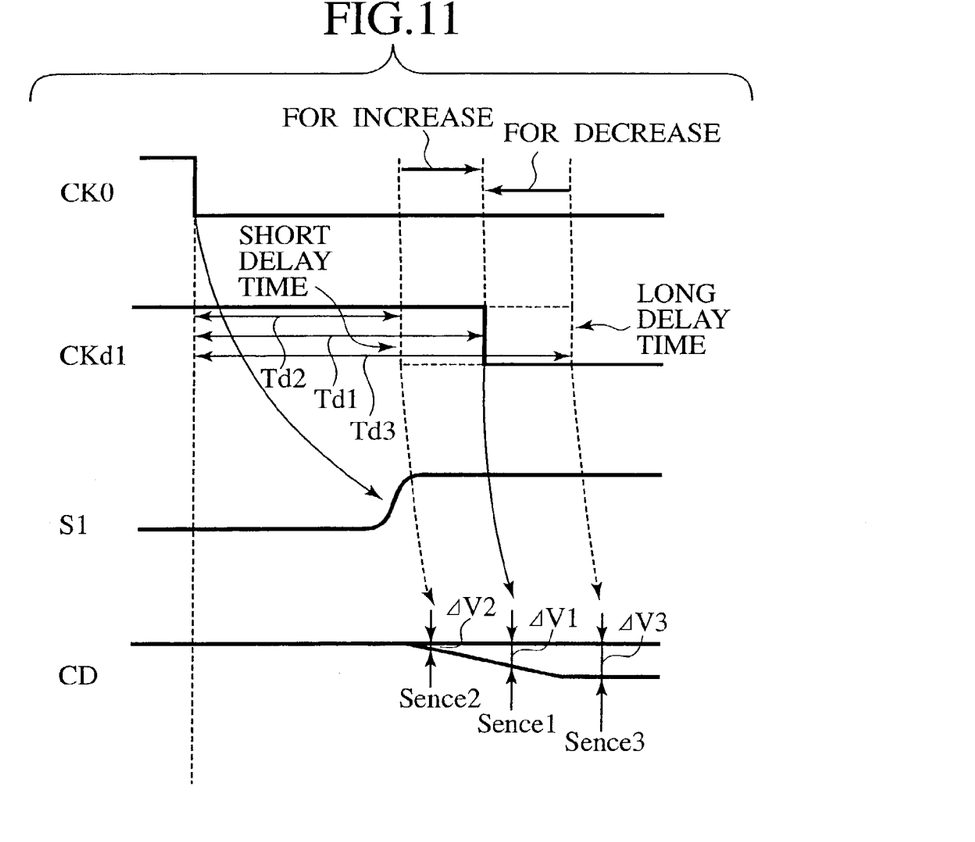
FIG. 11 is a timing chart (1) for explaining operations of a semiconductor device of an embodiment.
Figure 12:
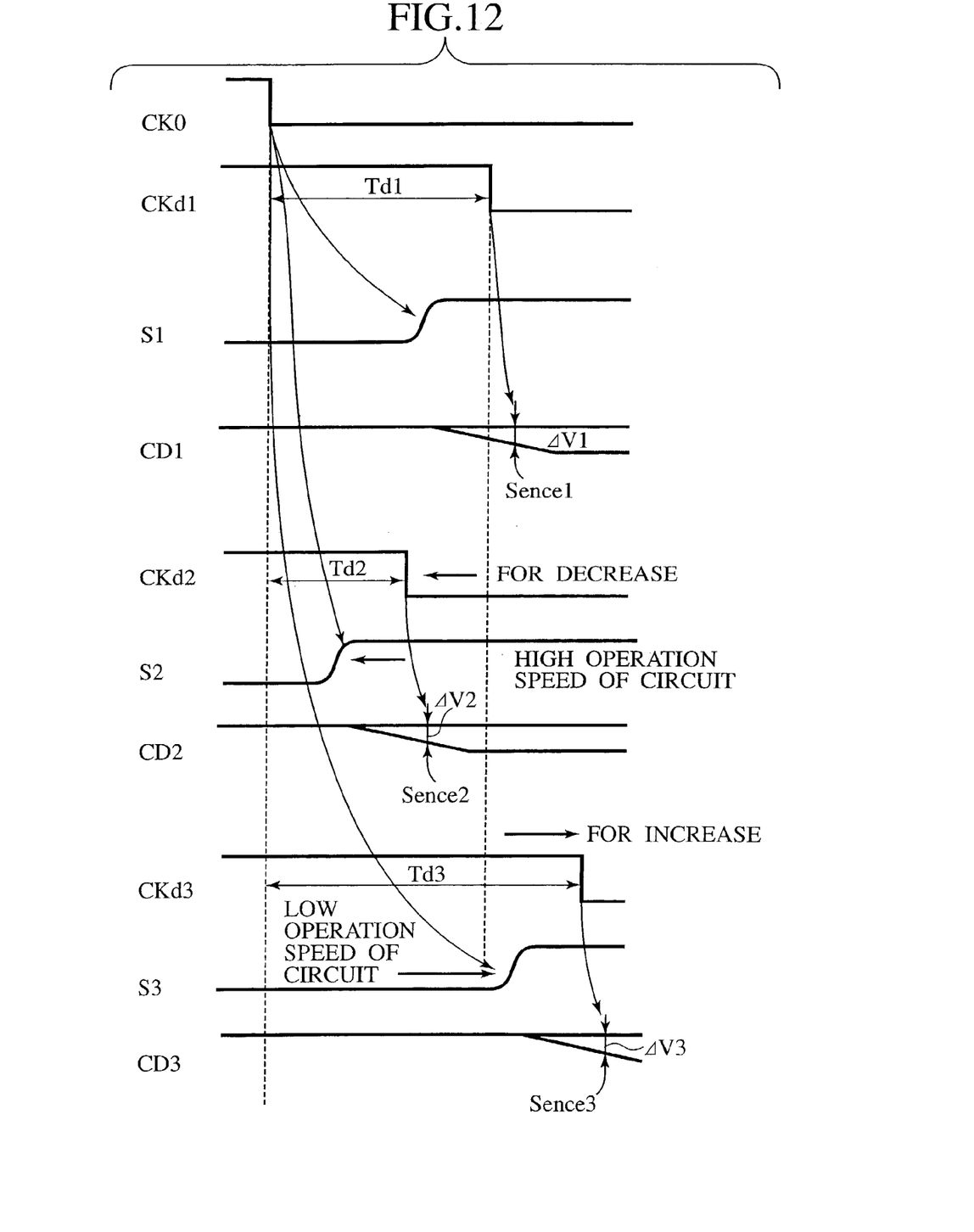
FIG. 12 is a timing chart (2) for explaining operations of a semiconductor device of an embodiment.

By summarizing the above discussion, operations of the delay time control circuit 2 in FIG. 1 are qualitatively described below as shown in FIG. 10. When the counted value of the oscillation signal F11 of the ring oscillator 25 is smaller than the counted value when the semiconductor device 1 is fabricated in the target process, the operation speed of the setting circuit 3 of the delay time T1, serving as a circuit to be measured, decreases. In this case, as shown in FIG. 11, a delay time Td3 (T1) becomes longer than a delay time Td1 when the semiconductor device 1 is fabricated in the target process. Therefore, the delay time Td3 (T1) of a clock delay signal CKd1 from the clock signal CK0 is decreased. Thereby, the sense time of the sense amplifier 10 changes from Sense3 to Sense1 and it is possible to reduce the read time of the cell data signal CD.

However, when the counted value of the oscillation signal F11 of the ring oscillator 25 is larger than the counted value when the semiconductor device 1 is fabricated in the target process, the operation speed of the setting circuit 3 of the delay time T1 decreases as shown in FIG. 10. In this case, as shown in FIG. 11, a delay time Td2 (T1) decreases. Therefore, the delay time Td2 (T1) of the clock delay signal CDd from the clock signal CK0 is increased. Thereby, the sense time of the sense amplifier 10 changes from Sense2 to Sense1. It is possible to raise a potential generated as 1 or 0 of the cell data signal CD at the sense time of the sense amplifier 10 from a potential ΔV2 to a potential ΔV1.

Moreover, when counted values of oscillation signals F21 and F31 of the ring oscillators 26 and 27 are smaller than the counted value when the semiconductor device 1 is fabricated in the target process, operation speeds of the decoder 8 and cell array 10, serving as circuits to be measured, are decreased as shown in FIG. 10. A cell selection signal S3 and a cell data signal CD3 are output later compared to a cell selection signal S1 and cell data signal CD1 of the semiconductor device 1 fabricated in the target process. In this case, the delay times T2 and T3 are increased. Therefore, the delay time Td3 (T1) of the clock delay signal CKd from the clock signal CK0 is increased. Thereby, it is possible to raise a potential ΔV3.

However, when counted values of the oscillation signals F21 and F31 of the ring oscillators 26 and 27 are larger than the counted value when the semiconductor device 1 is fabricated in the target process, operation speeds of the decoder 8 and cell array 10 are decreased as shown in FIG. 10. A cell selection signal S2 and cell data signal CD2 are output later compared to the cell selection signal S1 and cell data signal CD1 of the semiconductor device 1 fabricated in the target process. In this case, the delay times T2 and T3 are decreased. Therefore, the delay time Td2 (T1) of the clock delay signal CKd from the clock signal CK0 is decreased. Thereby, it is possible to reduce the read time of the cell data signal CD2.

For this embodiment, the sense timing of the sense amplifier 7 is described. However, in the case of a synchronous RAM, it is possible to use the delay-time control circuit 2 for various cases. For example, it is possible to use the circuit 2 for the write timing. Moreover, it is possible to use the delay-time control circuit 2 to optimize various timings such as FQ timing, memory-cell activation timing, write timing, and recovery timing.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claim are therefore intended to embraced therein.

What is claimed is:

1. A semiconductor device formed on a semiconductor substrate, comprising:
   a cell array disposed on the semiconductor substrate, configured to operate synchronously with a first clock signal, and configured to output a first output signal delayed by a first delay time from the first clock signal;
   a first measuring circuit configured to measure indirectly a first increase and a first decrease of the first delay time, the first measuring circuit comprising:
   a first oscillation circuit disposed on the semiconductor substrate and configured to oscillate for a first constant time,
   a first counter configured to count a first oscillation frequency during the first constant time,
   a first value-detecting circuit configured to determine a second increase which is configured to signify the first decrease of the first oscillation frequency and a second decrease which is configured to signify the first increase of the first oscillation frequency;
   a setting circuit configured to operate synchronously with the first clock signal, configured to output a second clock signal delayed from the first clock signal by a second delay time adding the first increase and subtracting the first decrease; and
a second circuit configured to input the first output signal and configured to operate synchronously with the second clock signal.

2. The semiconductor device as claimed in claim 1, wherein the first oscillation circuit includes a ring oscillator.

3. The semiconductor device as claimed in claim 1, wherein a gate length, gate insulating film thickness, and threshold voltage of a transistor of the first oscillation circuit are equal to a gate length, gate insulating film thickness, and threshold voltage of a transistor of a critical path for influencing the first delay time of the cell array.

4. The semiconductor device as claimed in claim 1, wherein a resistance and a capacitance of the first oscillation circuit are equal to a resistance and a capacitance of a critical path for influencing the first delay time of the cell array.

5. The semiconductor device as claimed in claim 1, wherein the first oscillation circuit is disposed in or adjacent to the cell array on the semiconductor substrate.

6. The semiconductor device as claimed in claim 1, wherein the first counter includes toggle flip-flops.

7. The semiconductor device as claimed in claim 1, wherein the first value-detecting circuit is configured to convert the first oscillation frequency into a first setting signal d1 by which the setting circuit can set the second delay time.

8. The semiconductor device as claimed in claim 7, wherein the setting circuit comprises,
a first non-conjunction configured to input the first clock signal and the first setting signal,
a second non-conjunction configured to input an output of the first non-conjunction, and
an inverter configured to input an output of the second non-conjunction.

9. The semiconductor device as claimed in claim 1, wherein the second circuit is a sense amplifier.

10. A semiconductor device formed on a semiconductor substrate, comprising:
a cell array disposed on the semiconductor substrate, configured to operate synchronously with a first clock signal, and configured to output a first output signal delayed by a first delay time from the first clock signal;
a first measuring circuit configured to measure indirectly a first increase and a first decrease of the first delay time;
a setting circuit configured to operate synchronously with the first clock signal, configured to output a second clock signal delayed from the first clock signal by a second delay time adding the first increase and subtracting the first decrease;
a second circuit configured to input the first output signal and configured to operate synchronously with the second clock signal;
a third circuit disposed on the semiconductor substrate, configured to operate synchronously with the first clock signal, and configured to output a second signal delayed from the first clock signal by a third delay time to the cell array; and
a second measuring circuit configured to measure a third increase and a third decrease of the third delay time to a third set value; wherein
the setting circuit sets the second delay time adding the third increase and subtracting the third decrease synchronously with the first clock signal.

11. The semiconductor device as claimed in claim 10, wherein the second measuring circuit comprises
a second oscillation circuit disposed on the semiconductor substrate and configured to oscillate for a second constant time,
a second counter configured to count a second oscillation frequency during the second constant time, and
a second value-detecting circuit configured to determine a fourth increase and a fourth decrease of the second oscillation frequency.

12. The semiconductor device as claimed in claim 11, wherein the second value-detecting circuit converts the second oscillation frequency into a second setting signal by which the setting circuit can set the second delay time.

13. The semiconductor device as claimed in claim 12, wherein the setting circuit further includes a majority-decision circuit for receiving the first setting signal and the second setting signal and outputting a majority value of the signals as the first setting signal.

14. The semiconductor device as claimed in claim 11, wherein the second oscillation circuit includes a ring oscillator.

15. The semiconductor device as claimed in claim 11, wherein a gate length, gate insulating film thickness, and threshold voltage of a transistor of the second oscillation circuit are equal to a gate length, gate insulating film thickness, and threshold voltage of a transistor of a critical path for influencing the third delay time of the third circuit.

16. The semiconductor device as claimed in claim 11, wherein a resistance and a capacitance of the second oscillation circuit are equal to a resistance and a capacitance of a critical path for influencing the third delay time of the third circuit.

17. The semiconductor device as claimed in claim 11, wherein the second oscillation circuit is disposed in or adjacent to the third circuit on the semiconductor substrate.

18. The semiconductor device as claimed in claim 10, wherein the third circuit is a decoder.

19. A semiconductor device formed on a semiconductor substrate, comprising:
a first circuit disposed on the semiconductor substrate, configured to operate synchronously with a first clock signal, and configured to output a first output signal delayed by a first delay time from the first clock signal;
a first measuring circuit configured to measure indirectly a first increase and a first decrease of the first delay time, the first measuring circuit comprising:
a first oscillation circuit disposed on the semiconductor substrate and configured to oscillate for a first constant time,
a first counter configured to count a first oscillation frequency during the first constant time, and
a first value-detecting circuit configured to determine a second increase which is configured to signify the first decrease of the first oscillation frequency and a second decrease which is configured to signify the first increase of the first oscillation frequency;
a setting circuit configured to operate synchronously with the first clock signal, configured to output a second clock signal delayed from the first clock signal by a second delay time adding the first increase and subtracting the first decrease; and
a second circuit configured to input the first output signal and configured to operate synchronously with the second clock signal.

* * * * *